United States Patent
Bai et al.

(10) Patent No.: US 10,772,327 B2
(45) Date of Patent: Sep. 15, 2020

(54) HERBICIDE COMPOSITION CONTAINING ISOPROPYLAMINE CAPRYLATE

(71) Applicant: HUNAN AGRICULTURAL BIOTECHNOLOGY RESEARCH INSTITUTE, Changsha (CN)

(72) Inventors: Lianyang Bai, Changsha (CN); Zuren Li, Changsha (CN); Xile Deng, Changsha (CN); Dingfeng Luo, Changsha (CN); Xiaogang Li, Changsha (CN); Xiaomao Zhou, Changsha (CN)

(73) Assignee: HUNAN AGRICULTURAL BIOTECHNOLOGY RESEARCH INSTITUTE, Changsha (CN)

( * ) Notice: Subject to any disclaimer, the term of this patent is extended or adjusted under 35 U.S.C. 154(b) by 129 days.

(21) Appl. No.: 15/984,436

(22) Filed: May 21, 2018

(65) Prior Publication Data

US 2019/0350202 A1  Nov. 21, 2019

(51) Int. Cl.
*A01N 37/02* (2006.01)
*A01N 25/12* (2006.01)
*A01N 33/02* (2006.01)

(52) U.S. Cl.
CPC .......... *A01N 37/02* (2013.01); *A01N 25/12* (2013.01); *A01N 33/02* (2013.01)

(58) Field of Classification Search
CPC ......... A01N 37/02; A01N 25/12; A01N 33/02
See application file for complete search history.

(56) References Cited

U.S. PATENT DOCUMENTS

| | | | | |
|---|---|---|---|---|
| 4,975,110 A * | 12/1990 | Puritch | .................. | A01N 37/02 504/142 |
| 5,919,734 A * | 7/1999 | Jones | ..................... | A01N 37/02 504/320 |
| 6,323,156 B1 * | 11/2001 | Smiley | .................. | A01N 37/02 504/320 |
| 2007/0196413 A1 * | 8/2007 | Stern | ..................... | A01N 25/14 424/417 |

OTHER PUBLICATIONS

Li JQ, Hou JQ, Gong ZH, Zhang J, Ren CC, Kang ZH, Zhang JL. A preliminary study on action of herbicidal mechanism of the ingredientll from *Flaveria bidentis*(L.) Kuntze. Journal of Agricultural University of Hebei.235(6):69-74 (in Chinese).
Chen YB,Wang JX, Wu XH, Liu JL, Zhang XF. Allelopathy of flower of *Partheniumhy sterophorus* L. on *Echinochloa crusgalli*(L.) Beauv. and the isolation and identification of allelochemicals. Acta Phytophylacica Sinica., 31(1):73-77 (in Chinese).
Yang J,Lu CY.The preemergence herbicidal mechanism of corn glutenmeal. Actaphytophylacica snica.37(4):370-374.(in Chinese).
Parag J,Ravindra P,Shiv S.Natural sources of anti-inflammation,Springer:India.2014,pp. 25-133.
Salimon J,Salih N,Yousif E.Industrial development and applications of plant oils and their biobasedoleochemicals, Arabian Journal of Chemistry.2012,5:135-145.
Liu SY,Ruan WB,Li J,Xu H,Wang JG,Gao YB,Wang JG.Biological Control of Phytopathogenic Fungi by Fatty Acids.Mycopathologia. 2008,166:93-102.
Duke SO,Why have no new herbicide modes of action appeared in recent years? Pesticide Management Science,2012,68(4):505-512.
Ash GJ,The science,art and business of successful bioherbicides. Biological Contro1,2010,52(3):230-240.
Dayan FE,Duke SO.Natural compounds as next-generation herbicides. Plant Physiology.2014,166(3):1090-1105.
Cheng SG,Qiang S. The status and future directions of bioherbicidestudy and development. Chinese Journal of Biological Control. 2015,31(5):770-779.(in Chinese).
Teng CH,Tao B,Lu ZC,Wang B,Liu YS,Cui SF.Review on research progress of botanical herbicides. Agrochemicals.2013,52(9):632-634.(in Chinese).
Cespedes CL,Salazar JR,Castolo AA,Alarcon J.Biopesticides from plants:*Calceolaria integrifolias*.Environmental Research.2014,132:391-406.
Grayson BL,Williams KS,Freehauf PA,Reinsfelder RE.The phyrsical and chemical properties of the herbicide cinmethylin(SD95481). Pesticide Science.1987,21:143-153.
Mitchell G,Bartlett DW,Fraser TM,Hawkes TR,Daivd CH,Townson JK,Wichert RA.Mesotrione,a new selective herbicide for use in maize.Pesticide Management Science.2001,57(2):120-128.
Gao XX,Li M,Gao ZJ, Zhao Y,Zhang HJ,Li ZQ,Song GC.The releasing mode of the allelochemicals in *Conyza canadesis* L. Acta Ecologica Sinica.2010,8:1966-1971.(in Chinese).
MA SJ,Liu L,Lu XP,MA ZQ,Zhang X.Herbicidal Activities of Alkaloids from Cephalotaxus sinensis. Scientia Agricultura Sinica. 2016,19:3746-3753.(in Chinese).

* cited by examiner

*Primary Examiner* — Mina Haghighatian
*Assistant Examiner* — Nathan W Schlientz
(74) *Attorney, Agent, or Firm* — Duane Morris LLP; Thomas J. Kowalski; Deborah L. Lu

(57) ABSTRACT

Provided is a herbicidal composition comprising a compound of Formula (I) as a herbicidally active ingredient, and an agronomically acceptable additive,

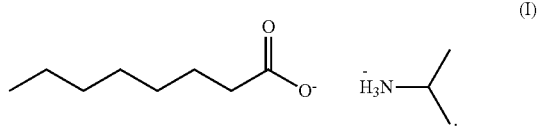

(I)

Also provided is a method of controlling undesirable vegetation using the herbicide composition.

17 Claims, 1 Drawing Sheet

HERBICIDE COMPOSITION CONTAINING ISOPROPYLAMINE CAPRYLATE

FIELD OF THE INVENTION

The present invention relates to a method of applying a herbicide composition comprising a fatty acid amine salt and to herbicidal compositions comprising said salt. The present compositions are environmentally friendly and do not have undesired effects on animals or humans. The herbicidal compositions are further devoid of an oil component.

BACKGROUND OF THE INVENTION

Allelochemicals or secondary metabolites in many plants can affect seed germination, growth and development, density, and distribution of plants, and are an important source for the development of herbicides (Cespedes et al., 2014). A large number of natural products having herbicidal activities are being screened and tested throughout the world by researchers. For example, Conyza canadensis, Cephalotaxus sinensis, Flaveria bidentis, Partheniumhy sterophorus, corn protein powder and other plant extracts have been confirmed to contain herbicidally active ingredients (Gao Xingxiang, et al., 2010; Ma Shujie et al., 2016; Li Jianqiang, et al., 2012; Chen Yebing et al., 2010; Yang Jian and Lu Changyi, 2010).

Only a few plant derived herbicides, however, are registered or approved for use. These include cinmethylin, a highly effective broad-spectrum herbicide successfully developed as a derivative of cineole extracted from plants. After entering into plants such as rice, soybean, cotton, and peanuts, this compound can be metabolized into a hydroxyl derivative, which then binds to glycosides in the plants to form a conjugate, thus losing its toxicity (Grayson et al., 1987). Another successful example of herbicides developed from the plant allelochemicals is the triketone herbicides, specifically sulcotrione and mesotrione, with leptospermone developed as a lead compound. Leptospermone is a highly effective inhibitor of Phydroxyphenyl-pyruvate dioxygenase (HPPD). When used for pre- and post-emergence treatment, certain grass (Poacea) and broad-leaved weeds develop symptoms of albinism; however, maize is resistant to leptospermone (Mitchell et al., 2001).

The development of commercially viable, highly effective, broad-spectrum and safe plant-derived herbicides remains an arduous and lengthy process, and it is necessary to expand the plant species to be screened, and make structural derivatives of natural compounds having herbicidal activities.

Fatty acid herbicides are well known in the art and are generally considered to be environmentally friendly. Fatty acid herbicides are typically supplied as concentrates that are diluted with water and applied as an oil-in-water emulsion. These concentrates usually contain the fatty acid active ingredient and emulsifying agents including surfactants and oils such as sodium dodecyl benzene sulfonate (ABS).

Caprylic acid, also referred to as n-octanoic acid, and widely found in Myristica fragrans, lemongrass, apples, coconut oil, wine, and hops etc., has a molecular formula of $C_8H_{16}O_2$ and is a colorless transparent oily liquid having a sweat smell. It is mainly used in the production of dyes, drugs, spices, plasticizers, lubricants, or as preservatives and fungicides, etc. (Parag et al., 2014; Salimon et al., 2012; and Liu et al., 2008).

U.S. Pat. Nos. 4,975,110; 5,106,410 and 5,098,467 disclose fatty acid herbicidal compositions that contain $C_{8-12}$ fatty acids, a surfactant and water with pelargonic acid being a preferred fatty acid herbicide. U.S. Pat. Nos. 5,098,468 and 5,035,741 also disclose fatty acid herbicidal compositions that contain $C_{8-12}$ carbon fatty acids, an oil component, an emulsifier and water. Single phase concentrates are disclosed in U.S. Pat. Nos. 5,098,468 and 5,035,741 that contain the fatty acid(s), oil and emulsifier.

U.S. Pat. No. 5,919,734 discloses herbicides comprising fatty acids and a compatible oil component.

Fatty acid herbicides include fatty acid esters of $C_6$-$C_{20}$ monocarboxylic acids such as those disclosed in U.S. Pat. No. 5,284,819.

Additionally, fatty acid salts such as those disclosed in U.S. Pat. Nos. 2,626,862; 4,975,110; 5,035,741, and 6,930,075 can be employed as fatty acid herbicides.

However, no water soluble fatty acid salt has been found to be an effective herbicide alone without another petrochemical-based herbicide (e.g. glyphosate), or without an emulsifier, or without an oil component.

Caprylic acid was mentioned as a component in prior art herbicidal compositions (e.g. U.S. Pat. Nos. 4,031,140; 4,663,364, disclosing a herbicidal powder; U.S. Pat. No. 5,919,734, disclosing an oil-based fatty acid herbicidal composition; U.S. Pat. No. 6,930,075, disclosing a fatty acid-based herbicidal composition; and U.S. Pat. No. 9,578,877, disclosing cocoalkylpolyamine alkoxylates as agents for high strength herbicide compositions, where caprylic acid is mentioned as a supplement.

Caprylic acid, however, has never been used as a primary agrochemical active ingredient or herbicidal ingredient prior to the instant invention. Further, no disclosure of the isopropyl amine salt of caprylic acid as an effective herbicidal agent was found in the prior art.

BRIEF SUMMARY OF THE INVENTION

The present inventors, by screening various components of coconut oil and making derivatives therefrom, have identified the isopropyl amine salt of caprylic acid (isopropylamine caprylate) as an effective herbicidal agent.

Accordingly, in accordance with an embodiment of the present invention, a herbicidal composition is provided which comprises the isopropyl amine salt of caprylic acid of Formula (I), and an agronomically acceptable additive,

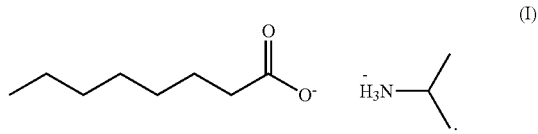

The herbicidal composition is a foliar applied, non-selective herbicide.

The herbicidal composition may comprise the isopropyl amine salt of caprylic acid as the only active ingredient.

The herbicidal composition is devoid of an oil component.

The agronomically acceptable additive can be a carrier, an adjuvant, an antifoaming agent, a compatibilizing agent, a sequestering agent, a neutralizing agent, a dye, an odorant, a penetration aid, a wetting agent, a spreading agent, a thickening agent, a freeze point depressant, a humectant, a conditioner, an antimicrobial agent, an emulsifier, an effervescent agent, an anti-caking agent, or a combination of two or more of the above. Depending on different formulations, the carrier can be water, white carbon black or other vehicles. The adjuvant can be silicone, alkylether citrate, methyl soyate, tea saponin, aliphatic amines with epoxy groups, or the combination thereof. In one embodiment, the spreading agent is sodium lignosulfonate. In one embodiment, the anti-caking agent is silica. In one embodiment, the effervescent agent is a mixture of sodium bicarbonate and citric acid, preferably mixed at a weight ratio of 1 to 1.5.

The herbicidal composition can be prepared as an aqueous solution formulation, a powder formulation, or a granule formulation. The powder formulation and the granule formulation may be water-soluble. The aqueous solution formulation may contain about 1-99 wt %, preferably about 20-45 wt %, more preferably about 30-45 wt %, and most preferably about 30 wt %, of the isopropyl amine salt of caprylic acid. The powder formulation may contain about 1-99%, preferably about 65-90 wt %, more preferably about 75-90% and most preferably about 75 wt % of the isopropyl amine salt of caprylic acid. The granule formulation may contain about 1-99 wt %, preferably about 65-90 wt %, and more preferably about 75.7% of the isopropyl amine salt of caprylic acid.

A second aspect of the present invention is directed to a method of controlling undesirable vegetation, the method comprising using the composition according to the invention as a control agent.

The method comprises the steps of contacting a plant, wherein the plant is undesirable vegetation, with a herbicidally effective amount of a herbicidal composition of the present invention.

The undesirable vegetation is controlled in direct-seeded, water-seeded and transplanted rice, cereals, wheat, barley, oats, rye, sorghum, corn/maize, sugarcane, sunflower, rapeseed, canola, sugar beet, soybean, cotton, pineapple, pastures, grasslands, rangelands, fallowland, turf, tree and vine orchards, aquatics, industrial vegetation management (IVM) or rights of way (ROW). In some embodiments, the undesirable vegetation is controlled crops intolerant to glyphosate-, 5-enolpyruvylshikimate-3-phosphate synthase inhibitor-, glufosinate-, glutamine synthetase inhibitor-, dicamba-, phenoxy auxin-, pyridyloxy auxin-, synthetic auxin-, auxin transport inhibitor-, aryloxyphenoxypropionate-, cyclohexanedione-, phenylpyrazoline-, acetyl CoA carboxylase inhibitor-, imidazolinone-, sulfonylurea-, pyrimidinylthiobenzoate-, triazolopyrimidine-, sulfonylaminocarbonyltriazolinone-, acetolactate synthase or acetohydroxy acid synthase inhibitors-, 4-hydroxyphenyl-pyruvate dioxygenase inhibitor-, phytoene desaturase inhibitor-, carotenoid biosynthesis inhibitor-, protoporphyrinogen oxidase inhibitor-, cellulose biosynthesis inhibitor-, mitosis inhibitor-, microtubule inhibitor-, very long chain fatty acid inhibitor-, fatty acid and lipid biosynthesis inhibitor-, photosystem I inhibitor-, photosystem II inhibitor-, triazine-, or bromoxynil-based hebicides.

The herbicidal composition of the present invention is applied pre-emergently or post-emergently, preferably by spraying, to undesirable vegetation. Preferably, the herbicidal composition is applied to the foliage of undesirable vegetation.

The herbicidal composition of the present invention is applied to undesirable vegetation in an amount per acre of 0.1-8 kg, preferably 0.30-1.5 kg, more preferably 0.30-1.21 kg, more preferably 0.91-1.21 kg, more preferably 1.21 kg, of the isopropyl amine salt of caprylic acid.

The present invention also provides the use of the isopropyl amine salt of caprylic acid of Formula (I) in the preparation of a herbicidal composition.

DETAILED DISCLOSURE OF THE INVENTION

Figure 1:
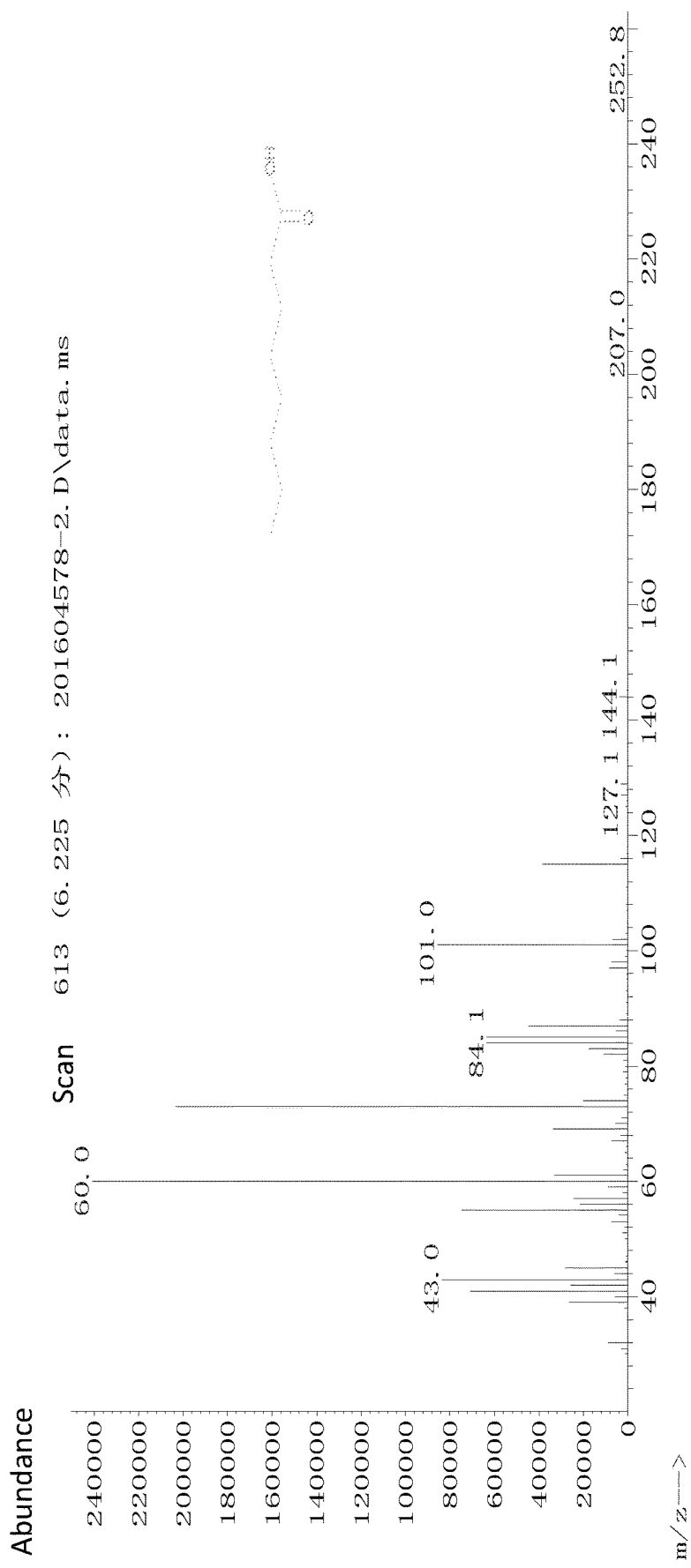
FIG. 1 is a mass chromatogram of caprylic acid (6.225 min)

Coconuts were physically squeezed into coconut oil, which was then saponified, acidified, distilled, and fractionated. Caprylic acid was identified by gas chromatography-mass spectrometry. With caprylic acid as a lead compound, the isopropyl amine salt of caprylic acid was synthesized, and found to have the best characteristics compared to other derivatives, e.g. the sodium or potassium salts of caprylic acid. This derivative is soluble in water and has a higher solubility than caprylic acid. Therefore, it is more environmentally friendly to prepare herbicide formulations therewith.

Indoor toxicity test was carried out with *Echinochloa crusgalli*, *Ludwigia prostrata* and another 10 weeds as test objects. The $ED_{50}$ values of isopropylamine caprylate for *Echinochloa crusgalli* and *Ludwigia prostrata* were 4.07 mg/mL and 0.52 mg/mL, respectively, which were both lower than the $ED_{50}$ values of caprylic acid (14.07 mg/mL and 12.52 mg/mL) and glyphosate isopropylamine salt (52.18 mg/mL and 46.79 mg/mL), suggesting that compared with the control caprylic acid and aqueous isopropylamine glyphosate solution, the isopropyl amine salt of caprylic acid was more toxic to the *Echinochloa crusgalli* and *Ludwigia prostrata* weeds. Field test results showed that the isopropyl amine caprylate showed herbicidal effects of 71.7%-92.3% 7 days post herbicide application when aqueous isopropylamineg lyphosate solution had not completely exerted its effect yet. Further, 15 days after the herbicide application, 15 g of 30% aqueous isopropylamine caprylate solution showed herbicidal effects of up to 84.58%, and 20 g of 30% aqueous isopropylamine caprylate solution produced herbicidal effects of 94.77%, neither significantly different from that of the aqueous isopropylamine glyphosate solution.

Thus, the present inventors have concluded that the isopropyl amine salt of caprylic acid is a highly active, quick-acting herbicidal ingredient. Moreover, the field experiments have showed good herbicidal effects of 30% isopropylamine caprylate aqueous solution on a variety of weeds such as *Conyza canadensis, Setaria viridis, Solanum nigrum*, and *Artemisia argyi*.

Thus, the present invention provides the isopropyl amine salt of caprylic acid as a broad-spectrum herbicidally active ingredient, with the potential to replace paraquat and glyphosate. Paraquat has been discontinued in most markets due to its toxicity, and the safety of glyphosate is increasingly being questioned, yet no suitable alternative herbicides have been found yet (Williams G M et al. 2016; Myers et al. 2016). Due to its high activity, fast action, and broad herbicidal spectrum, and other properties, the isopropyl amine salt of caprylic acid has the potential to replace paraquat and glyphosate.

Accordingly, in one embodiment, the present invention provides a herbicidal composition which comprises the isopropyl amine salt of caprylic acid as the active herbicidal ingredient. Although caprylic acid was used in herbicidal compositions in the art, it has never been used as an active herbicidal ingredient, especially not as the only active herbicidal ingredient.

In one embodiment, the herbicidal composition of the present invention contains only the isopropyl amine salt of caprylic acid as the active herbicidal ingredient. To put it another way, a herbicidal composition of the present invention consists essentially of the isopropyl amine salt of caprylic acid as the herbicidally active ingredient, and other ingredients conventionally used in herbicide formulation and manufacturing.

As ordinarily skilled artisan would know, herbicidal compositions generally also contain, in addition to herbicidally active ingredients, inactive ingredients or additives such as a carrier, an adjuvant, an antifoaming agent, a compatibilizing agent, a sequestering agent, a neutralizing agent, a dye, an odorant, a penetration aid, a wetting agent, a spreading agent, a thickening agent, a freeze point depressant, a humectant, a conditioner, an antimicrobial agent, an emulsifier, an effervescent agent, an anti-caking agent, or a combination of two or more of the above.

In specific, the herbicidal composition may usually contain a suitable carrier, which can be water in an aqueous solution formulation or a powder formulation, or alternatively white carbon black in a granule formulation. The carrier is used in some embodiments to dilute the active ingredients so as to uniformly apply the composition with a lowered cost. The herbicide adjuvant is a substance for improving the herbicidal activity of the composition of the present invention. For example, silicone, alkylether citrate, methyl soyate, tea saponin, or aliphatic amines with epoxy groups, when employed as a herbicide adjuvant in the present invention, contributes to the adhesion of the active ingredients to the plant foliage to prolong the action time.

The present herbicidal composition may be prepared as an aqueous solution, a powder, or a granule formulation through a variety of known formulation and mixing techniques well known to the art. The powder formulation and the granule formulation can be soluble in water.

The present composition is a foliar applied, non-selective herbicide which may be sprayed upon unwanted weeds and grasses.

The composition is most effective against young, succulent and actively growing weeds less than five inches in height. Several applications of the composition may be necessary to control certain grasses and established weeds, such as maturing (flowering) and woody weeds. Repeated applications of the composition may be necessary to kill perennial weeds.

Examples of annual weeds controllable by this herbicidal composition include Lambsquarter, Pigweed, Mustard, Shepherd's purse, Spiney annual sow thistle, Pineapple weed, Scentless mayweed, Wild buckwheat, Green foxtail, Stinkweed, Corn spurry, Common groundsel, Red sheep sorrel, Common chickweed, Wild radish, Common purslane, Whitestem filaree, Little mallow, Volunteer oat, False flax and Barnyard grass. In one embodiment, the annual weeds include *Echinochloa crusgalli, Beckmannia syzigachne, Poa annua, Ludwigia prostrata, Conyza candesis, Xanthium sibiricum, Stellaria media, Eleusine indica, Pharbitis purpurea* and *Cardamine hirsute.*

Examples of perennial weeds controllable by this herbicidal composition include Spotted catsear, True dandelion, Narrow-leaf plantain, Curled dock, Horsetail, Mouse-eared chickweed, Lupine, Clovers, Perennial ryegrass, Thistles and Quackgrass. In one embodiment, the perennial weeds include *Eleocharis yokoscensis, Myosoton aquaticum,* and *Veronica persica, Stellaria media.*

The herbicidal composition of this invention may be applied by conventional spraying means. In one embodiment, the composition is applied to thoroughly cover all of the foliage of undesirable vegetation.

Most succulent annual weeds and grasses 5" or less in height, and top kill of perennials can be controlled with isopropylamine caprylate at an amount of 0.1-8 kg/acre, preferably 0.30-1.5 kg/acre, more preferably 0.304-1.21 kg/acre, and more preferably 0.91-1.21 kg/acre. Larger annual weeds, weeds in dense stands, and more difficult to control perennials may require a higher level of isopropylamine caprylate, for example, ranging from 0.30 kg/acre to 8 kg/acre.

The following examples illustrate the practice of the present invention and should not be construed as limiting its scope.

EXAMPLES

Example 1

Extraction and Identification of Caprylic Acid

Juice and shell were removed from a ripe coconut, and the remaining flesh was physically pressed to obtain coconut oil and milk. The coconut oil and milk was filtered twice and incubated in an incubator at 60° C. for 3 hours. After the oil was completely separated from the rest, filtration was performed twice to obtain natural coconut oil. The coconut oil was saponified, acidified, and hydrogenated during distillation, with the fractions collected for gas chromatography.

The fractions were diluted with acetone (chromatographically pure) and then analyzed for its chemical composition by gas chromatography-mass spectrometry. For the GC-MS analysis, quartz capillary columns (Stabilwax-DA, 30 in×0.25 mm×0.32 m) were used, and the temperature was initially set at 50° C. for 2 min and then raised to 230° C. at a rising speed of 8° C./min and held for 5 min; helium (purity t>99.99%) was used as the carrier gas, and EI ion source (70 eV) was employed; and mass spectral scan range was at 45-450 m/z.

The obtained chromatograms were studied to identify the chemical components. Caprylic acid was identified at t=6.225 min, as shown in FIG. 1.

Example 2

Synthesis and Identification of Isopropylamine Caprylate

Isopropylamine caprylate was synthesized from caprylic acid as illustrated in the following scheme.

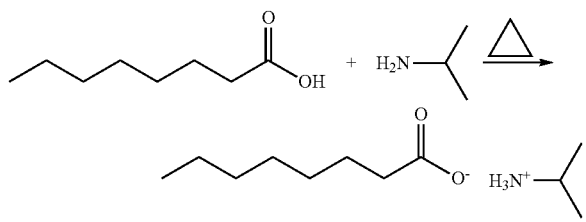

Specifically, 10.0 g (0.069 mol) of caprylic acid was added to 100 ml of anhydrous chloroform. After caprylic acid was dissolved, 8.16 g (0.138 mol) of isopropylamine was added dropwise. The mixture was heated to and held at 70° C. and allowed to react for 4 hours. Thereafter, the reaction system was cooled to room temperature and evaporated in a rotary evaporator to give a white liquid of 10.94 g (yield: 73%, melting point: 115° C.).

The crystal structure of isopropylamine caprylate was identified by nuclear magnetic resonance on Bruker AM-400.0 NMR spectrometer (with TMS as an internal standard). The $^1$H NMR was determined at 500 MHz, and the $^{13}$C NMR was determined at 150 MHz.

1H NMR (500 MHz, CDCl$_3$) δ: 0.85 (t, 3H, J=7.5 Hz, CH$_2$), 1.21-1.30 (m, 15H, CH$_2$+CH$_3$), 1.51-1.56 (m, 2H, CH$_2$), 2.12 (t, 3H, J=7.5 Hz, CH$_2$), 3.22-3.28 (m, 1H, CH), 8.14 (s, 3H, NH); 13C NMR (125 MHz, CDCl$_3$) δ: 181.17, 43.16, 38.44, 31.93, 29.81, 29.33, 26.67, 22.77, 21.36, 14.21.

The $^{13}$C NMR and $^1$H NMR data showed that the compound was isopropylamine caprylate having the formula below.

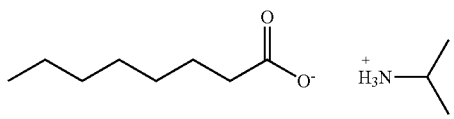

Example 3

Preparation of Aqueous Isopropylamine Caprylate Solution

The 20-45% aqueous isopropylamine caprylate solution was formulated as follows. Specifically, water and caprylic acid (97%) were weighed, put into a reactor and stirred. Isopropylamine was added dropwise into the solution, with the head part of the dropping pipette inserted into the solution. Reaction was allowed to proceed at 50-80° C. for 3-4 hrs to obtain a transparent liquid. Finally, the liquid was added with and mixed with certain adjuvant(s) (one or two selected from the group consisting of silicone, alkylether citrate, and methyl soyate). The resultant formulation was cooled to room temperature and sampled for inspection. The qualified product was filtered and packaged.

TABLE 1

Formulation of 30% aqueous isopropylamine caprylate solution

| Starting material | Specification | Proportion | Purpose |
|---|---|---|---|
| Caprylic acid | 97% | 16.52% | For neutralization |
| Isopropylamine | 99% | 13.48% | For synthesis of active ingredient |
| Adjuvant | Silicone | 10-12% | Special adjuvant |
| Water | Deionized water | q.s. to 100% | Vehicle/carrier |

Example 4

Preparation of Water-Soluble Isopropylamine Caprylate Powder

The 65-90% isopropylamine caprylate powder was formulated as follows. White carbon black was used as the carrier. One or two selected from sodium lignosulfonate, calcium lignosulfonate, and sodium naphthalenesulfonate formaldehyde condensate were employed as the spreading agent. The adjuvant was one or two selected from the group consisting of silicone, tea saponin, and aliphatic amines with epoxy groups. The anti-caking agent was one or two selected from the group consisting of potassium ferrocyanide, silica, and sodium aluminosilicate. By controlling the ratio of starting materials and the diameter size of the screen, the 65-90% isopropylamine caprylate powders were produced.

TABLE 2

Formulation of 75% isopropylamine caprylate powder

| Agent type | Raw material | Specification | Proportion |
|---|---|---|---|
| Active ingredient | Isopropylamine caprylate | 99% | 75% |
| Spreading agent | Sodium lignosulfonate | 99% | 6% |
| Adjuvant | Silicone | | 4% |
| Anti-caking agent | Silica | 99% | 3% |
| Carrier | White carbon black | | q.s. to 100% |

Example 5

Preparation of Water-Soluble Isopropylamine Caprylate Granules

The 65-90% isopropylamine caprylate granules were formulated as follows. The adjuvant was one or two selected from the group consisting of silicone, tea saponin, and aliphatic amines with epoxy groups. The effervescent agent was a mixture of sodium bicarbonate and citric acid. Water was used as the solvent. All these materials were mixed and fed into an extruder for granulation. The resulting soluble granules were dried to obtain soluble isopropylamine caprylate granules. By controlling the ratio of starting materials and the diameter size of the screen, the 65-90% granules were produced.

TABLE 3

Formulation of 75.7% isopropylamine caprylate granules

| Agent type | Raw material | Specification | Proportion |
|---|---|---|---|
| Active ingredient | Isopropylamine caprylate | 99% | 1000 g |
| Adjuvant | Silicone | | 190 g |
| Effervescent agent | Mixture of sodium bicarbonate and citric acid | 1:1.5 | 65 g |
| Solvent | Water | | 63 g |

Example 6

Indoor Test for Herbicidal Activity of Isopropylamine Caprylate

Indoor toxicity test was performed by spraying isopropylamine caprylate as synthesized in Example 2 on plant stems and leaves (NY/T 1155.4-2006). Specifically, *Echinochloa crusgalli* and *Ludwigia prostrata*, together with other 9 weeds (see Table 4 below), were planted in 35 pots at 18-20° C. in a 16 h light:8 h dark cycle with illumination at 100-120 umol·m$^{-2}$·s$^{-1}$, each pot having 20 *Echinochloa crusgalli* and 20 *Ludwigia prostrata* with uniform sizes. These pots were divided into 7 groups, and treated with (1) 20 ml of 5 mg/ml aqueous isopropylamine caprylate solution, (2) 20 ml of 25 mg/ml aqueous isopropylamine caprylate solution, (3) 20 ml of 50 mg/ml aqueous isopropylamine caprylate solution, (4) 20 ml of 100 mg/ml aqueous isopropylamine caprylate solution, (5) 20 ml of 250 mg/ml aqueous isopropylamine caprylate solution, (6) 20 ml of distilled water, or (7) 20 ml of an aqueous solution containing 1 g of isopropylamine glyphosate (PD20070650, Fengchun Chemical Co., Ltd, Lingshan, Guangxi) at Day 0.

At Day 7, the portion of the weed above the ground was weighed for 11 weed species, including *Echinochloa crusgalli* and *Ludwigia prostrata*. Based on the fresh weight data, herbicidal effect was calculated according to the following formula:

$$E=100\times(C-T)/C$$

wherein E represented the herbicidal effect, and C and T represented the fresh weights of the above-ground portion of the weeds in the control group and treatment group, respectively.

The results were shown in Table 4 below.

were mainly *Pharbitis purpurea* and *Eleusine indica*, with a few *Galium aparine*, *Cynodon dactylon*, *Vicia gigantea*, *Mimosa pudica* and the like.

Eighteen (18) plots, each having an area of 20 m², were selected for the test. These plots were randomly divided into 6 groups and treated with (1) 5 g of 30% aqueous isopropylamine caprylate solution, (2) 10 g of 30% aqueous isopropylamine caprylate solution, (3) 15 g of 30% aqueous

TABLE 4

Herbicidal effect of isopropylamine caprylate on 11 weed species (Day 7) in indoor test

| Herbicide | Weed species | Toxicity regression equation y = a + bx | Correlation coefficient | $ED_{50}$ (mg/mL) 95% confidence interval of $ED_{50}$ | $ED_{90}$ (mg/mL) 95% confidence interval of $ED_{90}$ |
|---|---|---|---|---|---|
| Isopropylamine caprylate | *Echinochloa crusgalli* | y = 3.3428 + 1.4434x | 0.97 | 4.07 (2.66-10.48) | 28.65 (22.83-40.82) |
| | *Eleocharis yokoscensis* | y = 3.6674 + 2.1032x | 0.97 | 3.23 (2.00-9.55) | 24.11 (18.74-40.82) |
| | *Beckmannia syzigachne* | y = 5.4464 + 1.9974x | 0.97 | 3.07 (1.66-8.48) | 30.65 (24.12-44.50) |
| | *Poa annua* | y = 4.0028 + 1.4435x | 0.97 | 3.07 (2.66-10.48) | 28.65 (22.83-40.82) |
| | *Ludwigia prostrata* | y = 6.1103 + 1.4481x | 0.96 | 0.52 (0.35-0.61) | 13.21 (9.17-18.31) |
| | *Conyza candesis* | y = 4.3345 + 3.5198x | 0.98 | 0.74 (0.25-1.05) | 15.54 (8.74-20.93) |
| | *Myosoton aquaticum* | y = 7.4431 + 2.5304x | 0.99 | 0.18 (0.04-0.25) | 16.47 (8.35-20.23) |
| | *Xanthium sibiricum* | y = 5.1033 + 2.1824x | 0.96 | 0.64 (0.22-1.03) | 19.11 (10.80-31.14) |
| | *Veronica persica* | y = 5.0955 + 0.7613x | 0.97 | 0.78 (0.28-2.35) | 9.16 (5.09-22.65) |
| | *Stellaria media* | y = 4.0458 + 1.0078x | 0.97 | 0.80 (0.47-1.77) | 16.69 (7.91-26.98) |
| | *Cardamine hirsuta* | y = 5.7212 + 2.169x | 0.96 | 0.90 (0.11-2.46) | 18.36 (10.74-35.88) |
| Caprylic acid | *E. crusgalli* | Y = 3.3428 + 1.4434x | 0.97 | 14.07 (13.66-14.48) | 108.65 (92.83-124.80) |
| | *L. prostrata* | Y = 3.4108 + 1.4481x | 0.99 | 12.52 (10.66-14.43) | 96.04 (85.15-108.33) |
| Glyphosate isopropylamine | *E. crusgalli* | y = 2.3122 + 1.5043x | 0.97 | 52.18 (40.13-65.02) | 384.59 (360.35-420.77) |
| | *L. prostrata* | y = 2.2825 + 1.5051x | 0.99 | 46.79 (41.87-52.27) | 321.75 (271.72-380.99) |

It can be seen from results that the $ED_{50}$ values of isopropylamine caprylate for *Echinochloa crusgalli* and *Ludwigia prostrata* were 4.07 mg/ml and 0.52 mg/ml, respectively, which were lower than the $ED_{50}$ values of caprylic acid (14.07 mg/ml and 12.52 mg/ml, respectively) and glyphosate isopropylamine (52.18 mg/ml and 46.79 mg/ml, respectively), suggesting higher herbicidal activity of isopropylamine caprylate compared to caprylic acid.

Further, it was found that isopropylamine caprylate had better inhibitory effect on broad-leaved weeds such as *Ludwigia prostrata* than gramineous weeds such as *Echinochloa crusgalli*.

Example 7

Field Test for Herbicidal Activity of 30% Aqueous Isopropylamine Caprylate Solution A field test was performed at Chengdong Village, Yacheng Town, Yazhou District, Sanya City, Hainan Province, China (N 18°21' 19, E 109° 10' 25") where the weeds isopropylamine caprylate solution, (4) 20 g of 30% aqueous isopropylamine caprylate solution, (5) 9 g of 30% aqueous solution of isopropylamine glyphosate (PD20070650, Fengchun Chemical Co., Ltd, Lingshan, Guangxi), or (6) 150 mL of water at Day 0. These plots were investigated twice at Day 7 and Day 15, where weed number was counted at 5 points of each plot along the diagonal line, each point covering 0.25 m². After the investigation at Day 15, weeds at the 5 points were pulled out, of which the above-ground portion was weighed. Based on the weed number data, herbicidal activity was calculated according to the following formula:

$$E=100\times(C-T)/C$$

wherein E represented the herbicidal effect, and C and T represented the weed numbers in the control group and treatment group, respectively. The herbicidal effect was also calculated based on the fresh weight of the above-ground portion of the weeds, as described in Example 6.

The field test results were shown in Table 5 below.

TABLE 5

Herbicidal effect of isopropylamine caprylate in field test

| | Day 7 Herbicidal effect calculated based on weed number | | | Day 15 | | | | | |
|---|---|---|---|---|---|---|---|---|---|
| | | | | Herbicidal effect calculated based on weed number | | | Herbicidal effect calculated based on fresh weight of above-ground portion | | |
| Group | *Eleusine indica* | *Pharbitis purpurea* | Total weeds | *Eleusine indica* | *Pharbitis purpurea* | Total weeds | *Eleusine indica* | *Pharbitis purpurea* | Total weeds |
| 1 | 59.52d | 61.00d | 61.74d | 64.47d | 68.11e | 67.33e | 65.21d | 65.56d | 64.31d |
| 2 | 68.85c | 72.23c | 75.27c | 74.46c | 76.05d | 76.75d | 73.21c | 74.37c | 74.35c |
| 3 | 79.22b | 81.01b | 81.34b | 83.84b | 85.65c | 84.58c | 85.48b | 84.17b | 83.92b |

TABLE 5-continued

Herbicidal effect of isopropylamine caprylate in field test

|       | Day 7 Herbicidal effect calculated based on weed number | | | Day 15 | | | | | |
|       | | | | Herbicidal effect calculated based on weed number | | | Herbicidal effect calculated based on fresh weight of above-ground portion | | |
| Group | Eleusine indica | Pharbitis purpurea | Total weeds | Eleusine indica | Pharbitis purpurea | Total weeds | Eleusine indica | Pharbitis purpurea | Total weeds |
| --- | --- | --- | --- | --- | --- | --- | --- | --- | --- |
| 4 | 82.23a | 94.31a | 92.47a | 93.21a | 96.13a | 94.77a | 91.41a | 93.55a | 93.90a |
| 5 | 47.44e | 42.33e | 38.55e | 91.22a | 90.41b | 90.69b | 91.24a | 91.76a | 90.87a |

Mean values were used. Significant differences at P < 0.05 level were found among groups marked with different letters in the same column in Duncan's multiple range test.

It can be seen from Table 5 that the 30% aqueous isopropylamine caprylate solution provided a herbicidal effect of 61.74%~92.47% at Day 7 when the 30% aqueous isopropylamine glyphosate solution did not completely exert its influence. Further, the herbicidal effects of the 30% aqueous isopropylamine caprylate solution at Day 15, whether based on the weed number or the fresh weight of the above-ground portion of the weed, at the dose of 15 g and 20 g were not evidently different from that of the aqueous isopropylamine glyphosate solution. All these suggested that isopropylamine caprylate was a preferred plant-derived herbicide for controlling weeds, and had good herbicidal activity on *Pharbitis purpurea, Eleusine indica*, and the like.

REFERENCES

Duke S O. 2012. Why have no new herbicide modes of action appeared in recent years? Pesticide Management Science, 68(4): 505-512
Ash G J. 2010. The science, art and business of successful bioherbicides. Biological Control, 52(3): 230-240Dayan F E, Duke S O. 2014. Natural compounds as next-generation herbicides. Plant Physiology, 166(3): 1090-1105
Cheng S G, Qiang S. 2015. The status and future directions of bioherbicidestudy and development. Chinese Journal of Biological Control, 31(5): 770-779 (in Chinese)
Teng C H, Tao B, Lu Z C, Wang B, Liu Y S, Cui S F. 2013. Review on research progress of botanical herbicides. Agrochemicals, 52(9):632-634 (in Chinese)
Cespedes C L, Salazar J R, Castolo A A, Alarcon J. 2014. Biopesticides from plants: Calceolaria integrifolias.1. Environmental Research, 132:391-406
Grayson B L, Williams K S, Freehauf P A, Reinsfelder R E. 1987. The physical and chemical properties of the herbicide cinmethylin (SD95481). Pesticide Science, 21:143-153
Mitchell G, Bartlett D W, Fraser T M, Hawkes T R, Daivd C H, Townson J K, Wichert R A. 2001. Mesotrione, a new selective herbicide for use in maize. Pesticide Management Science, 57(2): 120-128
Gao X X, Li M, Gao Z J, Zhao Y, Zhang H J, Li Z Q, Song G C. 2010. The releasing mode of the allelochemicals in *Conyza canadesis* L. Acta Ecologica Sinica, 8:1966-1971 (in Chinese)
Ma S J, Liu L, Lu X P, Ma Z Q, Zhang X. 2016. Herbicidal Activities of Alkaloids from *Cephalotaxus sinensis*. Scientia Agricultura Sinica, (49) 19:3746-3753 (in Chinese)
Li J Q, Huo J Q, Gong Z H, Zhang J, Ren C C, Kang Z H, Zhang J L. 2012. A preliminary study on action of herbicidal mechanism of the ingredient II from *Flaveria bidentis* (L.) Kuntze. JOURNAL OF AGRICULTURAL UNIVERSITY OF HEBEI, 35(6):69-74 (in Chinese)
Chen Y B, Wang J X, Wu X H, Liu J L, Zhang X F. 2010. Allelopathy of flower of *Partheniumhy sterophorus* L. on *Echinochloa crusgalli* (L.) Beauv. And the isolation and identification of allelochemicals. Acta Phytophylacica Sinica, 31(1):73-77 (in Chinese)
Yang J, Lu C Y. The preemergence herbicidal mechanism of corn glutenmeal. Acta phytophylacica snica, 37(4):370-374 (in Chinese)
Parag J, Ravindra P, Shiv S. 2014. Natural sources of anti-inflammation. Springer: India, pp 25-133
Salimon J, Salih N, Yousif E. 2012. Industrial development and applications of plant oils and their biobasedoleochemicals. Arabian Journal of Chemistry, 5, 135-145
Liu S Y, Ruan W B, Li J, XuH, Wang J G, Gao Y B, Wang J G. 2008. Biological Control of Phytopathogenic Fungi by Fatty Acids. Mycopathologia, 166:93-102

What is claimed is:

1. A herbicidal composition comprising
an agronomically acceptable additive and
a herbicidally effective amount of a herbicidally active ingredient,
wherein the herbicidally active ingredient consists essentially of a compound of Formula (I)

2. The herbicidal composition of claim 1, wherein the herbicidal composition is devoid of an oil component.

3. The herbicidal composition of claim 1, wherein the agronomically acceptable additive comprises a carrier, an adjuvant, an antifoaming agent, a compatibilizing agent, a sequestering agent, a neutralizing agent, a dye, an odorant, a penetration aid, a wetting agent, a disperser, a thickening agent, a freeze point depressant, a humectant, a conditioner, an antimicrobial agent, an emulsifier, an effervescent disintegrant, an anti-caking agent, or a combination of two or more of the above.

4. The herbicidal composition of claim 3, wherein the carrier comprises water or white carbon black.

5. The herbicidal composition of claim 3, wherein the adjuvant comprises one or more of a silicone surfactant, alkylether citrate, methyl soyate, tea saponin, or aliphatic amines with epoxy groups.

6. The herbicidal composition of claim 1, wherein the herbicidal composition is an aqueous solution formulation, a powder formulation or a granule formulation.

7. The herbicidal composition of claim 6, wherein the aqueous solution formulation comprises 20-45 wt % of the compound of Formula (I).

8. The herbicidal composition of claim 6, wherein the powder formulation comprises 65-90 wt % of the compound of Formula (I).

9. The herbicidal composition of claim 6, wherein the granule formulation comprises 65-90 wt % of the compound of Formula (I).

10. A method of controlling undesirable vegetation, comprising
    contacting a plant of the undesirable vegetation with a herbicidally effective amount of a herbicidal composition,
        said herbicidal composition comprising
            an acronomically acceptable additive and
            a herbicidally active ingredient,
                wherein the herbicidally active ingredient consists essentially of a compound of Formula (I)

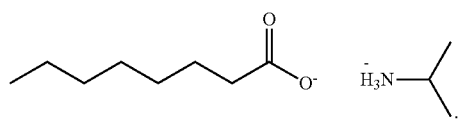

11. The method of claim 10, wherein the plant of the undesirable vegetation is located with direct-seeded rice, water-seeded rice, transplanted rice, cereal, wheat, barley, oats, rye, sorghum, corn/maize, sugarcane, sunflower, rapeseed, canola, sugar beet, soybean, cotton, pineapple, turf, a tree, an aquatic plant or a vine plant or the plant of the undesirable vegetation is located in a pasture, a grassland, rangeland, fallowland, a tree orchard, a vine orchard, an industrial vegetation management (IVM) or a right of way (ROW).

12. The method of claim 11, wherein the plant of the undesirable vegetation is pre-emergent.

13. The method of claim 11, wherein the plant of the undesirable vegetation is post-emergent.

14. The method of claim 11, wherein, the contacting is to foliage of the plant of the undesirable vegetation.

15. The method of claim 11, wherein, the contacting comprises applying a dose of 0.30-1.21 kg of the compound of Formula (I) per acre.

16. The method of claim 11, wherein the plant of the undesirable vegetation is among crops intolerant to a herbicide, wherein the herbicide comprises: glyphosate, a 5-enolpyruvylshikimate-3-phosphate synthase inhibitor, glufosinate, a glutamine synthetase inhibitor, dicamba, a phenoxy auxin, a pyridyloxy auxin, a synthetic auxin, an auxin transport inhibitor, aryloxyphenoxypropionate, a cyclohexanedione, a phenylpyrazoline, an acetyl CoA carboxylase inhibitor, a imidazolinone, a sulfonylurea, a pyrimidinylthiobenzoate, a triazolopyrimidine, a sulfonylaminocarbonyltriazolinone, an acetolactate synthase, an acetohydroxy acid synthase inhibitors, a 4-hydroxyphenylpyruvate dioxygenase inhibitor, a phytoene desaturase inhibitor, a carotenoid biosynthesis inhibitor, a protoporphyrinogen oxidase inhibitor, a cellulose biosynthesis inhibitor, a mitosis inhibitor, a microtubule inhibitor, a very long chain fatty acid inhibitor, a fatty acid biosynthesis inhibitor, a lipid biosynthesis inhibitor, a photosystem I inhibitor, a photosystem II inhibitor, a triazine, or a bromoxynil.

17. The method of claim 10, wherein the plant of the undesirable vegetation is among crops intolerant to a herbicide, wherein the herbicide comprises: glyphosate, a 5-enolpyruvylshikimate-3-phosphate synthase inhibitor, glufosinate, a glutamine synthetase inhibitor, dicamba, a phenoxy auxin, a pyridyloxy auxin, a synthetic auxin, an auxin transport inhibitor, aryloxyphenoxypropionate, a cyclohexanedione, a phenylpyrazoline, an acetyl CoA carboxylase inhibitor, a imidazolinone, a sulfonylurea, a pyrimidinylthiobenzoate, a triazolopyrimidine, a sulfonylaminocarbonyltriazolinone, an acetolactate synthase, an acetohydroxy acid synthase inhibitors, a 4-hydroxyphenylpyruvate dioxygenase inhibitor, a phytoene desaturase inhibitor, a carotenoid biosynthesis inhibitor, a protoporphyrinogen oxidase inhibitor, a cellulose biosynthesis inhibitor, a mitosis inhibitor, a microtubule inhibitor, a very long chain fatty acid inhibitor, a fatty acid biosynthesis inhibitor, a lipid biosynthesis inhibitor, a photosystem I inhibitor, a photosystem II inhibitor, a triazine, or a bromoxynil.

* * * * *